United States Patent [19]

Bergmann et al.

[11] 4,264,891
[45] Apr. 28, 1981

[54] DEVICE FOR RESETTING A DIRECTION-OF-TRAVEL INDICATOR IN AUTOMOBILES

[75] Inventors: Eduard Bergmann, Ludenscheid; Volker Speidel, Schalksmuhle, both of Fed. Rep. of Germany

[73] Assignee: Leopold Kostal, Fed. Rep. of Germany

[21] Appl. No.: 71,004

[22] Filed: Aug. 30, 1979

[30] Foreign Application Priority Data

Mar. 31, 1979 [DE] Fed. Rep. of Germany ....... 2913008

[51] Int. Cl.³ ............................................. B60Q 1/34
[52] U.S. Cl. ....................................... 340/56; 340/55; 340/73
[58] Field of Search .................. 340/56, 73, 52 R, 53, 340/54, 55

[56] References Cited

U.S. PATENT DOCUMENTS 3,914,737  10/1975  Sato ....................................... 340/73

Primary Examiner—Alvin H. Waring
Attorney, Agent, or Firm—Jacobs & Jacobs

[57] ABSTRACT

Device for resetting a direction-of-travel indicator for automobiles after completing a curve providing in association with the turnable steering-column/steering-wheel unit and in fixed position thereto switch elements, particularly opto-electrical transmitters and receivers coverable by a mask turnable with the steering-column/steering-wheel unit which when the steering wheel is turned back after going around a curve disconnects the directional indicator which has been actuated by a push switch and a scanning of the direction of rotation takes place. The device is characterized by a digital evaluation electronic system which satisfies a series of sequential conditions.

5 Claims, 8 Drawing Figures

FIG.2c₁
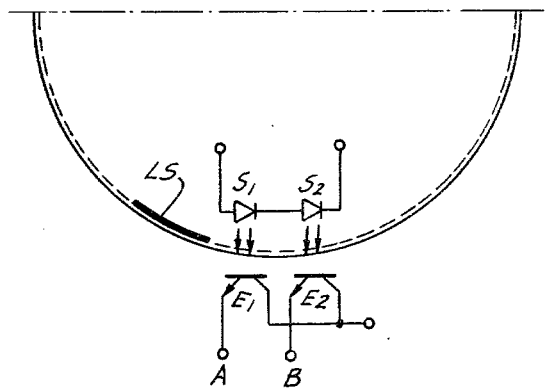
FIG.2a
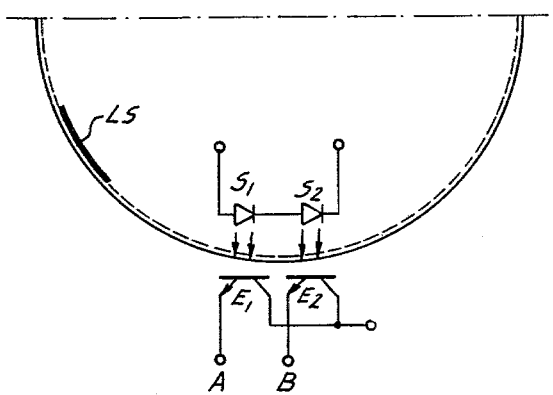
FIG.2c₂
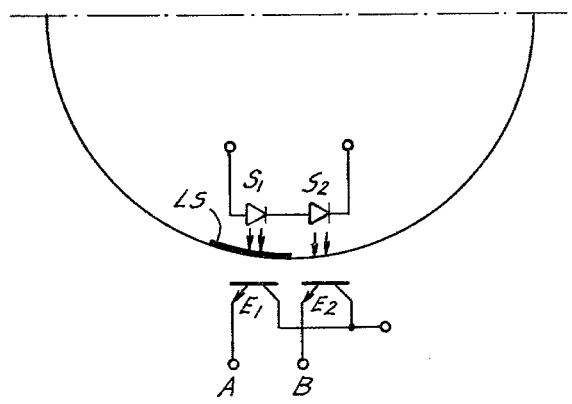
FIG.2b
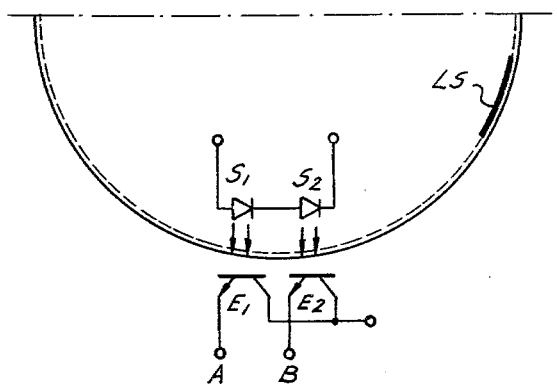
FIG.2c₃
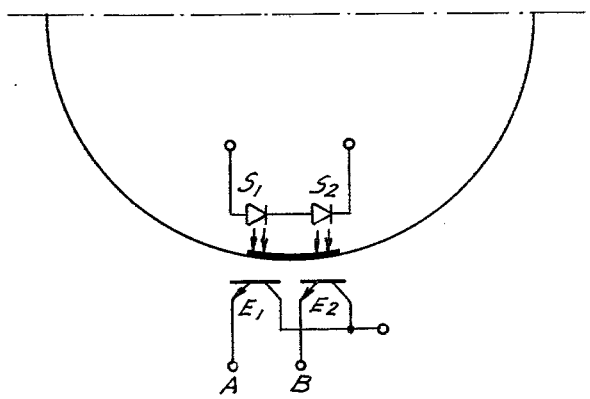

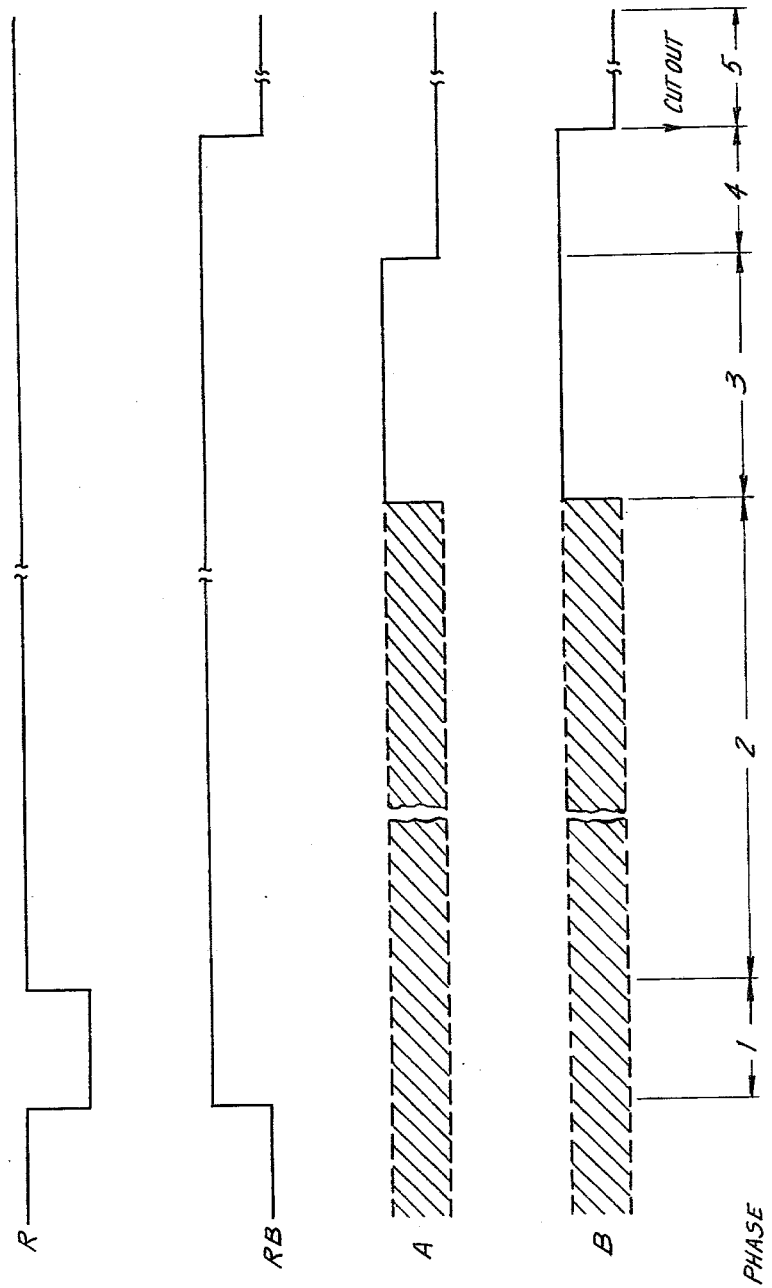

DEVICE FOR RESETTING A DIRECTION-OF-TRAVEL INDICATOR IN AUTOMOBILES

This invention relates to a device for resetting a direction-of-travel indicator for automobiles after completing a curve, in which there are provided, associated on the one hand with the turnable steering-column/steering-wheel unit and on the other hand fixed in position thereto, switch elements, and particularly opto-electrical transmitters and receivers which can be covered by a mask which is turnable with the steering-column/steering-wheel unit, which, upon the turning back of the steering wheel after going around a curve disconnect the directional indicator which has been actuated by push switch, in which connection furthermore a scanning of the direction of rotation takes place.

Electromechanical devices such as presently used in automobiles are known. These devices, however, have the disadvantage that they are subject to mechanical wear.

From German Unexamined Application for Pat. No. 26 08 865 an electronic solution with contact-free release using reed contacts as sensors of the direction of rotation are known. This system has the disadvantage that it has a critical angle of rotation of the steering wheel both in case of right-hand and in case of left-hand blinking, with the result that after actuation of the directional indicator only a very slight movement of the steering wheel in the opposite direction is necessary in order to reset the indication. This means, in contradistinction to the mechanical solutions, that in this case the release hysteresis (smallest necessary angle of rotation for release) strives towards zero depending on the position of the steering wheel.

Proceeding from this prior art, the object of the present invention is to create an electronic contact-less device in which the release proceeds purely digitally, the release hysteresis corresponding to that of electromechanical systems.

In order to achieve this purpose, the invention proposes that two photodiodes be provided as transmitters and two phototransistors as receivers and that there be provided as mask a light barrier the length of which is adapted to the lateral distance between the receivers and/or the transmitters and that futhermore the following digital evaluation electronic system satisfy the following conditions in sequence:

(a) During the actuation of the blinker push-member the release is prevented;

(b) Normalizing condition, light barrier is arranged outside the optical connection of the two transmitter-receiver units;

(c) Determination of direction, light barrier blocks the optical transmitter-receiver connection between the transmitter-receiver pair in front upon the turning back of the steering-column/steering-wheel unit;

(d) Release condition, light barrier blocks optical connection between the two transmitter-receiver pairs.

The opto-electric transmitters and receivers are installed in fixed position while a mask the size of which is adapted in advance to the distance between the transmitters and/or receivers is mounted on parts which turn during the steering. The manner of operation of the device is as follows.

The release or resetting of the directional indicator is not possible during the actuation of a blinker push member. Instead of the push switch some other operating element may also be provided.

The device is ready for release only when the light barrier has been moved out of the visual connection between the two transmitter-receiver devices. Upon the turning of the steering wheel in the same direction as the blinking indicator no release takes place upon the passage of the light barrier through the transmitter-receiver device.

Only upon the backward turning does the preparation for release take place, in the manner that the transmitter-receiver device which is first reached by the light barrier upon the backward turning becomes blocked. If thereupon the second transmitter-receiver device is also blocked by the light barrier the release takes place.

A preferred embodiment consists in the fact that the push switches for blinking left and blinking right respectively control the T input of cross-coupled JK flip-flops whose Q outputs control the corresponding blinking pulse generators, the resetting of the non-set flip-flop being assured by the cross coupling and the resetting of the set flip-flop taking place alternatively by setting the nonset flip-flop by actuation of the push member associated with it or by a corresponding pulse of the evaluation electronic system arranged behind the opto-electronic transmitters and receivers, which electronic system consists essentially of three flip-flops the first of which is always set when the light barrier is located outside the optical connection of the two transmitters and receivers and controls the preparation inputs of the two other flip-flops which control the corresponding reset inputs of said first-mentioned flip-flops, the cycle inputs of the second mentioned flip-flops being in each case dynamically controlled by the corresponding transmitter-receiver combinations.

The electronic system consists in practice of two stages: the release electronic system and the storage electronic system. The latter has two inputs from the push switches and two outputs to the blinker. The former has two inputs from the transmission-receiving stages while the outputs control the storage electronic system.

By the corresponding arrangement of the MS-flip-flop stages assurance is had that the resetting of the set upon rotation of the steering wheel in opposite direction of rotation and corresponding preparation of the flip-flop stages. The release hysteresis is in this connection a function of the lateral distance of the transmitters and receivers respectively from each other.

In order to be able to use push switches which are not free of chatter and to improve the freedom from interference of the circuit it is proposed that the outputs of the push switches and of the light barriers be dynamically taken over in D-flip-flops at a rate produced by a pulse generator.

In order to make tap blinking possible it is provided that the reset inputs of the flip-flops be controlled in addition via a timing member which is controlled alternatively by a push switch and a NOR-gate arranged behind same.

This circuit is explained in further detail in our own senior Application No. P 28 49 236.6-31.

Furthermore, it is advantageous for the flip-flops to be definitely reset at the moment of engagement of the circuit.

One embodiment of the invention is shown in the drawing and will be further described below. In the drawing:

FIG. 1 is a block diagram of the device;

FIGS. 2a–c are a description of the course of the release upon right-hand blinking;

FIG. 3 is a diagram for FIGS. 1 and 2a to c;

Figure 1:
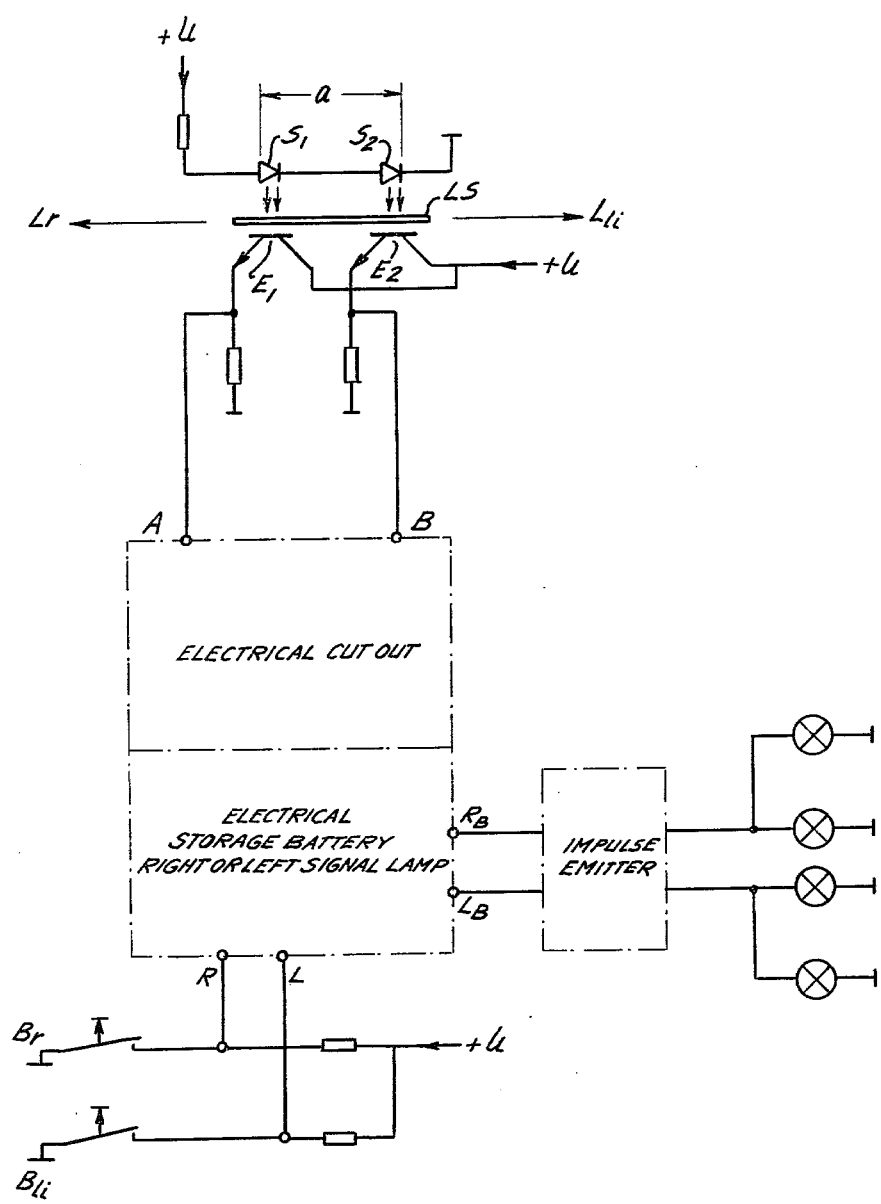

FIG. 1 shows diagrammatically the construction of a complete direction-of-travel indication. It consists of two photodiodes $S_1$, $S_2$ which are connected to supply voltage via a series resistor and to ground. The photodiodes $S_1$, $S_2$ are installed fixed in position on the steering wheel pot or some other stationary part.

On the rotatably supported steering wheel there is fastened a light barrier LS which can pass between the transmitters $S_1$, $S_2$ and the receivers $E_1$, $E_2$ which in their turn are fixed in position, and upon the turning of the steering wheel interrupts one or both optical connections between the corresponding transmitter-receiver devices. The spacing a between the transmitters $S_1$ and $S_2$ and the receivers $E_1$ and $E_2$ respectively is slightly less than the length of the light barrier LS and determines the size of the smallest angle necessary for the release of the electronic system. The spacing a can be selected suitably in accordance with practical requirements.

The arrows indicated to the left and right of the mask-like light barrier LS indicate the direction of movement of the light barrier upon clockwise and counter-clockwise turning of the steering wheel.

As receivers $E_1$, $E_2$ there are installed two phototransistors which are connected on the collector side to the supply voltage and on the emitter side to ground via a series resistor and to the sensor inputs A,B of the release electronic system. When there is an open optical connection between the corresponding transmitters $S_1$, $S_2$ and receivers $E_1$, $E_2$ the corresponding transistor is conductive.

The release electronic system controls the storage electronic system, which in its turn, via the outputs RB, LB, switches the blinking pulse generator and the blinking lights in known manner. The storage electronic system is actuated by the push switches $T_L$, $T_R$ one contact of which is connected to ground and the other to supply voltage (to series resistors), inputs R and L being controlled alternatively via the push switches.

Figure 4:
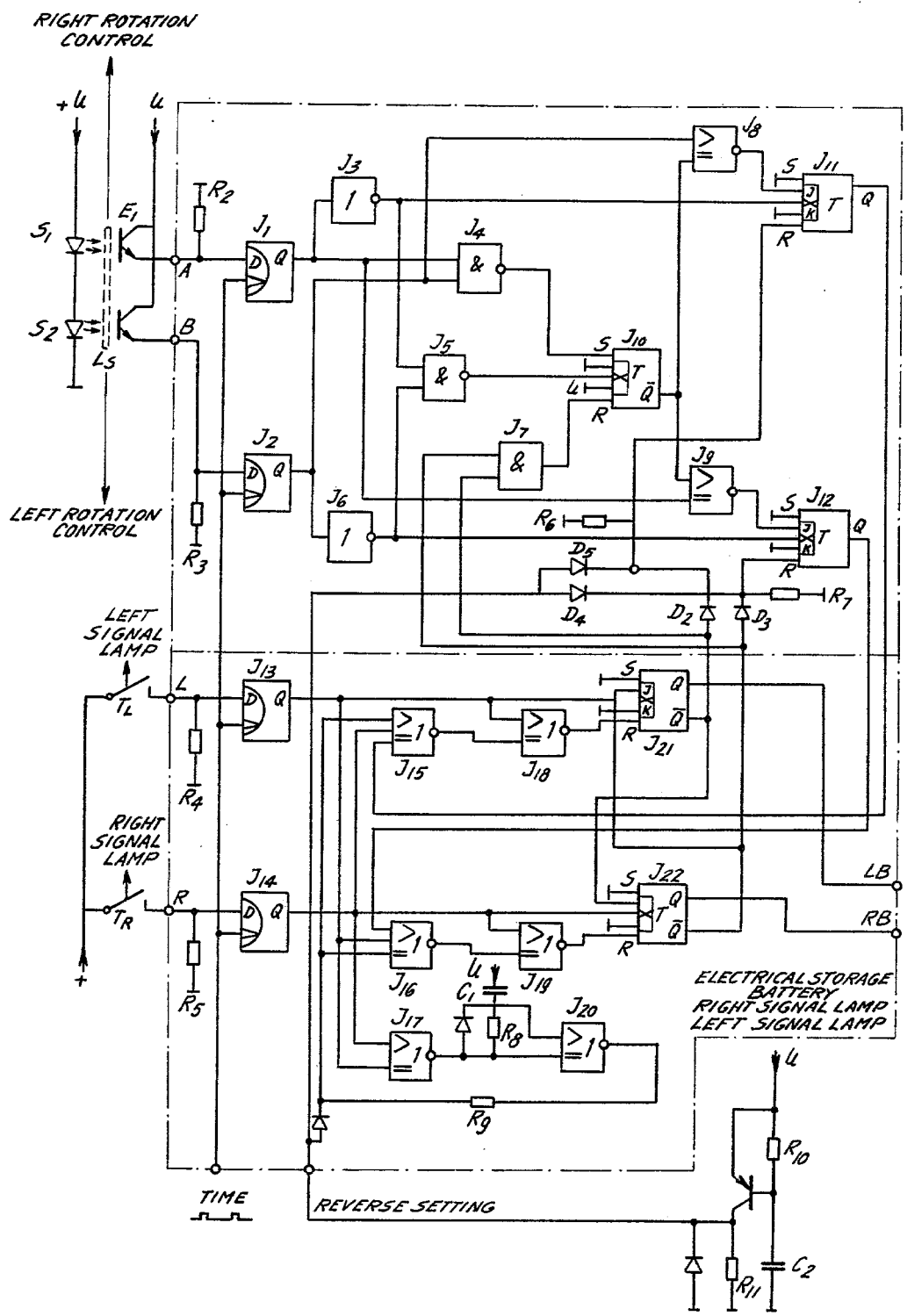
FIG. 4 shows a proposed circuit.

Under given conditions the storage states "blinker right" and "blinker left" are reset by the evaluation electronic system. The carrying out of the functions can be effected by a circuit specific to the customer or by microcomputer—in which case this function represents only a part of the total function—and by known integrated components, as shown in FIG. 4.

A description of the course of operations for "blinking right" with automatic release is shown in FIGS. 2 and 3. The course of "blinking left" is similar.

From the description of the course and FIGS. 1 to 3 the following can be noted as special features:

During the actuation of the blinker push member the release is without effect.

The reset process consists of two phases which take place one after the other, namely:

(a) Normalizing
(b) Detection of the direction of turning of the steering wheel
(c) Release.

The minimum required angle of turn is equal to the distance between the sensors (distance a in FIG. 1).

In accordance with FIG. 2a, the light barrier LS is at any arbitrary point when the right blinker is set. The direction of turning of the steering wheel is immaterial in this connection. Upon the turning of the steering wheel to the right (FIG. 2b) no release takes place, so that in this case also the position of the light barrier is unimportant. Upon turning of the steering wheel to the left (FIG. 2c), the normalizing condition must first of all be satisfied, i.e. the light barrier LS must be outside the optical connection transmitter $S_1$—receiver $E_1$ and transmitter $S_2$—receiver $E_2$ (FIG. 2c1). Then the determination of direction takes place upon further turning of the steering wheel to the left, the light barrier LS blocking the optical connection transmitter $S_1$—receiver $E_1$, but leaving the other transmission-reception station free (FIG. 2c2).

When upon further turning of the steering wheel in the same direction the light barrier LS also comes between transmitter $S_2$—receiver $E_2$ and blocks this optical connection, then the release condition is satisfied and the blinker is reset (FIG. 2c3). The corresponding diagram for this process with right blinking is shown in FIG. 3. Herein:

Phase 1 is setting of the right blinker (in accordance with FIG. 2a).

Phase 2 is turning of the steering wheel to the right (FIG. 2b).

Phase 3 is turning of the steering wheel to the left (FIG. 2c1).

Phase 4 is turning of the steering wheel to the left (FIG. 2c2).

Phase 5 is turning of the steering wheel to the left (FIG. 2c3).

FIG. 4 shows an embodiment of a direction indicating system with automatic electronic release.

This system is furthermore provided with a tap blinking possibility. The outputs of the operating push members $T_5$, $T_1$ "blink right" and "blink left" respectively as well as the outputs of the light barriers LS for the determination of the direction of the turning of the steering wheel are taken over dynamically at a cyclic rate T in D-flip-flops $J_1$, $J_2$, $J_{13}$, $J_{14}$. In this way the use of non-chatter-free push switches is possible. Furthermore this method affords great freedom from disturbance.

The storage electronic system for "blink right" and "blink left" respectively consists essentially of cross-coupled JK flip-flops $J_{21}$ and $J_{22}$. The cross-coupling-output $\overline{Q}$ $J_{21}$ to J input $J_{22}$, output $\overline{Q}$ $J_{22}$ to J input $J_{21}$-prevents a simultaneous setting of these flip-flop stages (outputs $J_{21}$, $J_{22}$ log "1").

The "blink left" procedure will be described now. The flip-flop stage $J_{21}$ is set when the output $J_{13}$ changes from log "0" to log "1" (actuation of the push member "blinking left") and the flip-flop stage $J_{22}$ ("blinking right") is not set, i.e. J input of $J_{21}$ is log "1". The NOR-gate $J_{18}$ is blocked as long as the "blinking left" push member is actuated (log "1" of $J_{13}$ log "0" on R-input of $J_{21}$); in this way the reset input R of $J_{21}$ is not active. If upon actuation of the "blinking left" push button the flip-flop stage $J_{22}$ is set, then a resetting of this flip-flop stage is first of all brought about (output $J_{16}$ log "0", output $J_{19}$ log "1"→reset flip-flop stage $J_{22}$). In this case, in order to set the flip-flop stage $J_{21}$ the "blinking left" push member must again be actuated. If the flip-flop stage $J_{21}$ is set, then "blinking left" is brought about by the signal LB to the blinking pulse generator. The resetting of this flip-flop stage can now take place in three different ways:

(1) Resetting of the flip-flop stage $J_{21}$ results by actuation of the "blinking right" push member (output $J_{14}$ log "1", output $J_{15}$ log "0", output $J_{18}$ log "1"→reset flip-flop stage $J_{21}$).

(2) Resetting by the RC-member $C_1$, $R_8$. With a given time of actuation of the "blinking left" push member the input threshold of the NOR-gate $J_{22}$ is exceeded in negative direction so that log "1" appears at the output of this gate, which results, via gates $J_{15}$ and $J_{18}$, in the resetting of the flip-flop stage $J_{21}$. In this case there is concerned a tap blinking process.

(3) Resetting of the flip-flop stage $J_{21}$ by the release electronic system (log "1" on the output $J_{11}$).

The release electronic system consists essentially of the flip-flop stages $J_{10}$, $J_{11}$ and $J_{12}$. The flip-flop stage $J_{10}$ is always set (log "1" at the input S of $J_{10}$) when the light barrier LS is located outside the optical connection transmitter 1—receiver 1 and transmitter 2—receiver 2 (output Q of $J_1$ and $J_2$ log "1", output $J_4$ log "1"→output $\overline{Q}$ of $J_{10}$ log "0").

There are two possibilities as reset conditions for $J_{10}$, namely:

(1) Dynamic resetting via input T of $J_{10}$ when the light barrier LS releases the optical connection transmitter 1—receiver 1 or transmitter 2—receiver 2 (change of the input T from "0" to "1").

(2) Resetting of $J_{10}$ when neither "blinking right" or "blinking left" is set (output $J_7$ log "1").

An automatic release, i.e. in this case "blink left" reset, takes place only when the following conditions are satisfied:

Output Q of $J_{10}$ log "0" (FIG. 3, phase 3), output Q of $J_2$ log "0" (optical connection transmitter 2 receiver 2 interrupted; FIG. 3: phase 4), change of the signal level at the cycle input T of the flip-flop stage $J_{11}$ from log "0" to log "1" (blocking of the optical connection transmitter 1—receiver 1, FIG. 3: phase 5). In this case, the output Q of $J_{11}$ becomes log "1" and resets the flip-flop stage $J_{21}$.

In detail the construction of the circuit is as follows:

The push switches $T_L$ and $T_R$ connected to the DC supply voltage control the input and R respectively of the storage electronic system, which inputs act on the D-inputs of the D-flip-flops $J_{13}$, $J_{14}$, the resistors $R_4$ and $R_5$ respectively arranged in parallel being connected to ground. The dynamic input of the flip-flops $J_{13}$, $J_{14}$ is controlled via a pulse generator (not shown) of the cyclic rate T. The output Q of the flip-flop $J_{13}$ controls the cycle input T of a JK flip-flop 21 which is cross-coupled with another JK flip-flop $J_{22}$. The output Q of $J_{13}$ furthermore controls a NOR-element $J_{16}$, a NOR-element $J_{17}$, and a NOR-element $J_{18}$. The output Q of the flip-flop $J_{14}$ correspondingly controls the cycle input of the JK flip-flop 22, as well as the NOR-element $J_{17}$, a NOR-element $J_{15}$ and the NOR-element $J_{19}$.

The NOR-elements $J_{15}$, $J_{16}$ are furthermore actuated via a switch stage SS, which acts at the time of connection, and via the output of a tap blinking circuit ($J_{17}$, $D_1$, $C_1$, $R_8$, $J_{20}$). Furthermore the NOR-element $J_{15}$ is actuated from the output Q of the MS flip-flop 11 and the NOR-element from the Q output of the MS flip-flop $J_{12}$ of the release electronic system. The output of $J_{15}$ controls the NOR-element $J_{18}$ and the output of $J_{16}$ the NOR-element $J_{19}$, the output of $J_{18}$ controlling the reset input R of $J_{21}$ and the output of $J_{19}$ the reset input of $J_{22}$. The Q output of $J_{21}$ passes via LB to the blinker and the Q output of $J_{22}$ via RB also to it in order in this way, depending on the signal, to set the blinker to the right or to the left or to reset it.

The output $\overline{Q}$ of $J_{21}$ controls the reset input of $J_{11}$ and the output $\overline{Q}$ of $J_{22}$ the reset input of $J_{12}$. The outputs $\overline{Q}$ of $J_{21}$ and $J_{22}$ are uncoupled in the case of log "0" by diodes $D_2$, $D_3$ from the reset inputs $J_{11}$ and $J_{12}$. The reset inputs of $J_{11}$ and $J_{12}$ are also controlled by the switch stage SS, a decoupling taking place here also by diodes $D_4$, $D_5$.

Behind the NOR-member $J_{17}$ there is connected a timing member $C_1$, $R_8$ (integrating member) whose capacitor $C_1$ is connected to supply voltage. In order to accelerate the course of the function the diode $D_1$ is connected in parallel to the resistor $R_8$. Upon actuation of a push member $T_L$ or $T_R$ the corresponding flip-flop $J_{21}$ or $J_{22}$ is set if it was previously unset.

With a given period of actuation of the push member, which depends on the dimensioning of the timing member, the input threshold of the NOR-member $J_{20}$ is exceeded in negative direction so that log "1" appears at the output of said member, which results, upon the opening of the push member via member $J_{15}$ and $J_{18}$, in the resetting of the corresponding flip-flop. This by definition is a tap blinking process.

The switch stage SS consists of a transistor $T_r$, and when the source of voltage is connected voltage is present at the emitter directly and at the base via the resistor $R_{10}$. The base is connected to ground via the capacitor $C_2$, and the collector is connected to ground via the resistor $R_{11}$.

By this switching stage the resetting of the flip-flop stages $J_{21}$, $J_{22}$, $J_{12}$, $J_{11}$ and indirectly $J_{10}$ takes place upon the connecting of the supply voltage.

The release electronic system has substantially the following contruction:

Two D-flip-flops $J_1$, $J_2$ are controlled at the cyclic rate T via the transmission-reception arrangement $S_1$, $E_1$, $S_2$, $E_2$. The Q output of $J_1$ controls the NOT-element $J_3$, the AND-element $J_4$ and the NOR-element $J_9$. In corresponding manner the Q output of $J_2$ controls the NOT-element $J_6$, the AND-element $J_4$ and the NOR-element $J_8$. The AND-element $J_4$ controls the set input of flip-flop $J_{10}$, the NOT-element $J_3$ controls the cycle input of $J_{11}$ and the NAND-element $J_5$, the NOT-element $J_6$ controls the cycle input of $J_{12}$ and the NAND-element $J_5$, which in its turn controls the cycle input of $J_{10}$. The $\overline{Q}$ output of $J_{10}$ controls the NOR-elements $J_8$ and $J_9$ which in their turn control the preparation inputs $J_{11}$ and $J_{12}$ respectively. The Q output of $J_{11}$ indirectly controls the reset input of $J_{21}$ and that of $J_{12}$ in corresponding manner the reset input of $J_{22}$.

The function of the circuit has been explained above.

All new, individual and combination features disclosed in the specification and/or drawing are considered to be essential for the invention.

We claim:

1. A device for resetting a direction-of-travel indicator for automobiles after completing a curve, in which there are provided, associated on the one hand with the turnable steering-column/steering-wheel unit and on the other hand fixed in position thereto, switch elements, and particularly opto-electrical transmitters and receivers which can be covered by a mask which is turnable with the steering-column/steering-wheel unit, which upon the turning back of the steering wheel after going around the curve disconnect a directional indicator which has been actuated by a push switch and in which connection furthermore a scanning of the direction of rotation takes place, characterized by a transmitter having two photo diodes and a receiver having two phototransistors, the mask being a light barrier the length of which is adapted to the lateral distance between the receivers and/or the transmitters and further characterized by a digital evaluation electronic system satisfying the following sequential conditions:

(a) release is prevented during the actuation of the blinker-push-member;
(b) as normalizing condition, light barrier is arranged outside the optical connection of the two transmitter-receiver units;
(c) to determine direction, the light barrier blocks the optical transmitter-receiver connection between the transmitter-receiver pair in front upon the turning back of the steering-column/steering-wheel unit; and
(d) for release condition, the light barrier blocks optical connection between the two transmitter-receiver pairs.

2. A device according to claim 1, wherein the push switches for blinking left and blinking right respectively control the T-input of cross-coupled JK-flip-flops whose Q outputs control the corresponding blink-pulse generators, the resetting of the non-set flip-flop being assured by the cross-coupling and the resetting of the set flip-flop being effected alternatively by setting the non-set flip-flop by actuation of the push member associated with it or by a corresponding pulse of the evaluation electronic system arranged behind the opto-electronic transmitters and receivers, which evaluation electronic system consists essentially of three flip-flops the first of which is always set when the light barrier is outside of the optical connection of the two transmitters and receivers and controls the preparation inputs of the other two flip-flops controlling the corresponding reset inputs of said first-mentioned flip-flops, the cycle inputs of the flip-flops being in each case dynamically controlled by the corresponding transmitter-receiver combinations.

3. A device according to claim 1, wherein the outputs of the push switches and of the light barriers are dynamically taken over in D-flip-flops at a rate produced by a pulse generator.

4. A device according to claim 2, wherein the reset inputs of the flip-flops are additionally controlled via a timing member which is alternatively controlled by a push switch and a NOR-gate arranged behind the same.

5. A device according to claim 2, wherein the flip-flops are definitely on set at the moment of engagement of the switching.

* * * * *